United States Patent
Riska et al.

(10) Patent No.: US 7,802,924 B2
(45) Date of Patent: Sep. 28, 2010

(54) FIBER OPTIC FERRULE

(75) Inventors: Joseph Edward Riska, Macungie, PA (US); Christopher E. Young, Fleetwood, PA (US)

(73) Assignee: Infinera Corporation, Sunnyvale, CA (US)

( * ) Notice: Subject to any disclaimer, the term of this patent is extended or adjusted under 35 U.S.C. 154(b) by 9 days.

(21) Appl. No.: 12/239,848

(22) Filed: Sep. 29, 2008

(65) Prior Publication Data

US 2010/0080510 A1 Apr. 1, 2010

(51) Int. Cl.
*G02B 6/38* (2006.01)
(52) U.S. Cl. .......................... 385/59; 385/60
(58) Field of Classification Search ............ 385/59, 385/60
See application file for complete search history.

(56) References Cited

U.S. PATENT DOCUMENTS

| | | | | |
|---|---|---|---|---|
| 4,291,943 A * | 9/1981 | Binek et al. | ............ | 385/56 |
| 4,846,566 A * | 7/1989 | Barnett et al. | ............ | 385/109 |
| 4,997,257 A * | 3/1991 | Spedding | ............ | 385/110 |
| 5,082,346 A * | 1/1992 | Myers | ............ | 385/54 |
| 5,331,796 A * | 7/1994 | Varga | ............ | 57/9 |
| 5,909,528 A * | 6/1999 | Tamekuni et al. | ............ | 385/137 |
| 6,072,932 A * | 6/2000 | Bennett et al. | ............ | 385/139 |
| 6,234,681 B1 * | 5/2001 | Shahid | ............ | 385/65 |
| 6,536,956 B2 * | 3/2003 | Luther et al. | ............ | 385/86 |
| 6,625,351 B2 * | 9/2003 | Cox et al. | ............ | 385/33 |
| 6,799,900 B2 * | 10/2004 | Shiino et al. | ............ | 385/80 |
| 6,873,770 B2 * | 3/2005 | Leung et al. | ............ | 385/52 |
| 6,910,808 B2 * | 6/2005 | Shigenaga et al. | ............ | 385/71 |
| 6,915,050 B2 * | 7/2005 | Koyasu et al. | ............ | 385/105 |
| 6,985,665 B2 * | 1/2006 | Baechtle | ............ | 385/136 |
| 7,108,431 B2 * | 9/2006 | Yang et al. | ............ | 385/78 |
| 7,431,514 B2 * | 10/2008 | Fujiwara et al. | ............ | 385/71 |
| 2001/0033712 A1 * | 10/2001 | Cox et al. | ............ | 385/33 |
| 2002/0106161 A1 * | 8/2002 | Kiani | ............ | 385/53 |
| 2002/0168150 A1 * | 11/2002 | Shiino et al. | ............ | 385/71 |
| 2002/0197048 A1 * | 12/2002 | Kwon et al. | ............ | 385/138 |
| 2003/0133688 A1 * | 7/2003 | Wing Leung et al. | ............ | 385/137 |
| 2003/0174971 A1 * | 9/2003 | Shigenaga et al. | ............ | 385/71 |
| 2003/0202768 A1 * | 10/2003 | Nasiri et al. | ............ | 385/137 |
| 2004/0114901 A1 * | 6/2004 | Baechtle | ............ | 385/136 |
| 2004/0156601 A1 * | 8/2004 | Koyasu et al. | ............ | 385/100 |
| 2004/0208456 A1 * | 10/2004 | Yang et al. | ............ | 385/78 |
| 2005/0031290 A1 * | 2/2005 | Shevchuk | ............ | 385/137 |
| 2005/0111811 A1 * | 5/2005 | Cooke et al. | ............ | 385/136 |
| 2006/0115218 A1 * | 6/2006 | Howard et al. | ............ | 385/59 |
| 2006/0245695 A1 * | 11/2006 | Fujiwara et al. | ............ | 385/71 |
| 2008/0101751 A1 * | 5/2008 | Luther et al. | ............ | 385/59 |
| 2008/0205823 A1 * | 8/2008 | Luther et al. | ............ | 385/59 |
| 2009/0060421 A1 * | 3/2009 | Parikh et al. | ............ | 385/71 |
| 2009/0060440 A1 * | 3/2009 | Wright et al. | ............ | 385/135 |

* cited by examiner

*Primary Examiner*—K. Cyrus Kianni
(74) *Attorney, Agent, or Firm*—David L. Soltz

(57) ABSTRACT

Consistent with the present disclosure, a ferrule is provided that includes first and second channels, for example. Multiple fibers of a ribbon cable, for example, are divided into groups and fed into corresponding channels of the ferrule. Since multiple channels are provided, however, each channel can be made relatively narrow. Thus, by providing smaller channel widths, the fibers in those channels experience less thermal stress. Moreover, the channels are spaced from one another so that the lateral spacing between adjacent fibers in the ribbon cable is maintained in the ferrule. As a result, the fibers are not bent laterally, and thus may experience little bending stress.

9 Claims, 8 Drawing Sheets

FIBER OPTIC FERRULE

BACKGROUND OF THE INVENTION

Optical components are often connected to one another by optical fibers. Often one component, however, may be housed separately from another component and a plurality of optical fibers may be required to connect the two components. In that case, an opening may be provided in each housing, through which the connection optical fibers are fed. In the housing opening, a multi-fiber ferrule may be provided as a plug to seal the housing and secure the optical fibers. Since the fibers are typically arranged in a linear array, referred to as a fiber ribbon, the ferrule may include a relatively wide slot that receives the optical fibers. After the fibers are placed in the slot, a solder glass is inserted into the slot and melted or reflowed. Since the solder glass is at an elevated temperature, the materials that make up the ferrule (e.g., glass, metal alloys such as "Kovar", and epoxy) have different coefficients of thermal expansion (CTE) and, thus, thermally expand at different rates, thereby placing a stress on the fibers. If the slots are relatively wide, those fibers closest to the ends of the slots experience the most stress and can break.

Accordingly, there is a need for a multi-fiber ferrule that can accommodate a relatively large number of optical fibers with reduced thermal stress.

SUMMARY OF THE INVENTION

Consistent with an aspect of the present disclosure, an optical device is provided that includes a body, which has first surface and a second surface opposite the first surface. a first plurality of optical fiber portions. The ferrule includes first and second pluralities of optical fiber portions. A first channel extends from the first surface to the second surface and defines a first opening in the first surface. The first channel is configured to accommodate the first plurality of optical fiber portions, each of which having a corresponding one of a plurality of first longitudinal axes. Each of the plurality of first longitudinal axes is separated from one another by a substantially uniform spacing. The body also has a second channel that extends from the first surface to the second surface and is configured to accommodate the second plurality of optical fiber portions. The second channel defines a second opening in the first surface. Each of the second plurality of optical fiber portions has a corresponding one of a plurality of second longitudinal axes, each of which being separated from one another by the spacing. In addition, the first opening is separated from the second opening such that one of the first plurality of longitudinal axes is laterally spaced in a second direction from one of the second plurality of longitudinal axes by the spacing, the second direction may be perpendicular to the first direction.

Consistent with an additional aspect of the present disclosure, a method of making an optical device is provided which comprises a step of providing a body having a first surface and a second surface opposite the first surface. The method also includes forming a first channel extending from the first surface to the second surface and defining a first opening in the first surface. In addition, the method includes providing a first plurality of optical fiber portions in the first channel, each of which having a corresponding one of a plurality of first longitudinal axes, and each of the plurality of first longitudinal axes is separated from one another by a substantially uniform spacing. The method further includes forming a second channel extending from the first surface to the second surface and providing a second plurality of optical fiber portions in the second channel. The second channel defines a second opening in the first surface, and each of the second plurality of optical fiber portions has a corresponding one of a plurality of second longitudinal axes. Each of the plurality of second longitudinal axes is separated from one another by the spacing. The first and second openings are separated from one another such that one of the plurality of first longitudinal axes is laterally spaced in a second direction from one of the plurality of second longitudinal axes by the spacing. The second direction may be perpendicular to the first direction.

Consistent with a further aspect of the present disclosure, a ferrule is provided that includes a body having a first surface and a second surface opposite the first surface. A first channel extends from the first surface to the second surface and is configured to accommodate a first plurality of optical fibers, the first plurality of optical fibers being arranged in a first linear array. Each of the first plurality of optical fibers has a corresponding one of a first plurality of longitudinal axes, and each of the first plurality of longitudinal axes is separated from one another by a substantially spacing. Each of the first plurality of longitudinal axes extends in a first direction. A second channel is also included in the body that extends from the first surface to the second surface. The second channel is configured to accommodate a second plurality of optical fibers, which are arranged in a second linear array. Each of the second plurality of optical fibers has a corresponding one of a second plurality of longitudinal axes. Each of the second plurality of longitudinal axes is separated from one another by the spacing and extends in the first direction. In addition, the first channel defines a first opening in the first surface and the second channel defines a second opening in the first surface. The first opening is separated from the first opening such that one of the first plurality of longitudinal axes is spaced in a second direction from one of the second plurality of longitudinal axes by the spacing. The second direction may be substantially perpendicular to the first direction.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION OF THE EMBODIMENTS

Consistent with the present disclosure, a ferrule is provided that includes first and second channels, for example. Multiple fibers of a ribbon cable, for example, are divided into groups and fed into corresponding channels of the ferrule. Since multiple channels are provided, however, each channel can be made relatively narrow. As noted above, thermal stress in a channel increases with increasing channel widths. Thus, by providing smaller channel widths, the fibers in those channels experience less thermal stress. Moreover, the channels are separated from one another so that the lateral spacing between adjacent fibers in the ribbon cable is maintained in the ferrule. As a result, the fibers are not bent laterally, and thus may experience little bending stress.

Reference will now be made in detail to the exemplary embodiments of the present disclosure, which are illustrated in the accompanying drawings. Wherever possible, the same reference numbers will be used throughout the drawings to refer to the same or like parts.

Figure 1:
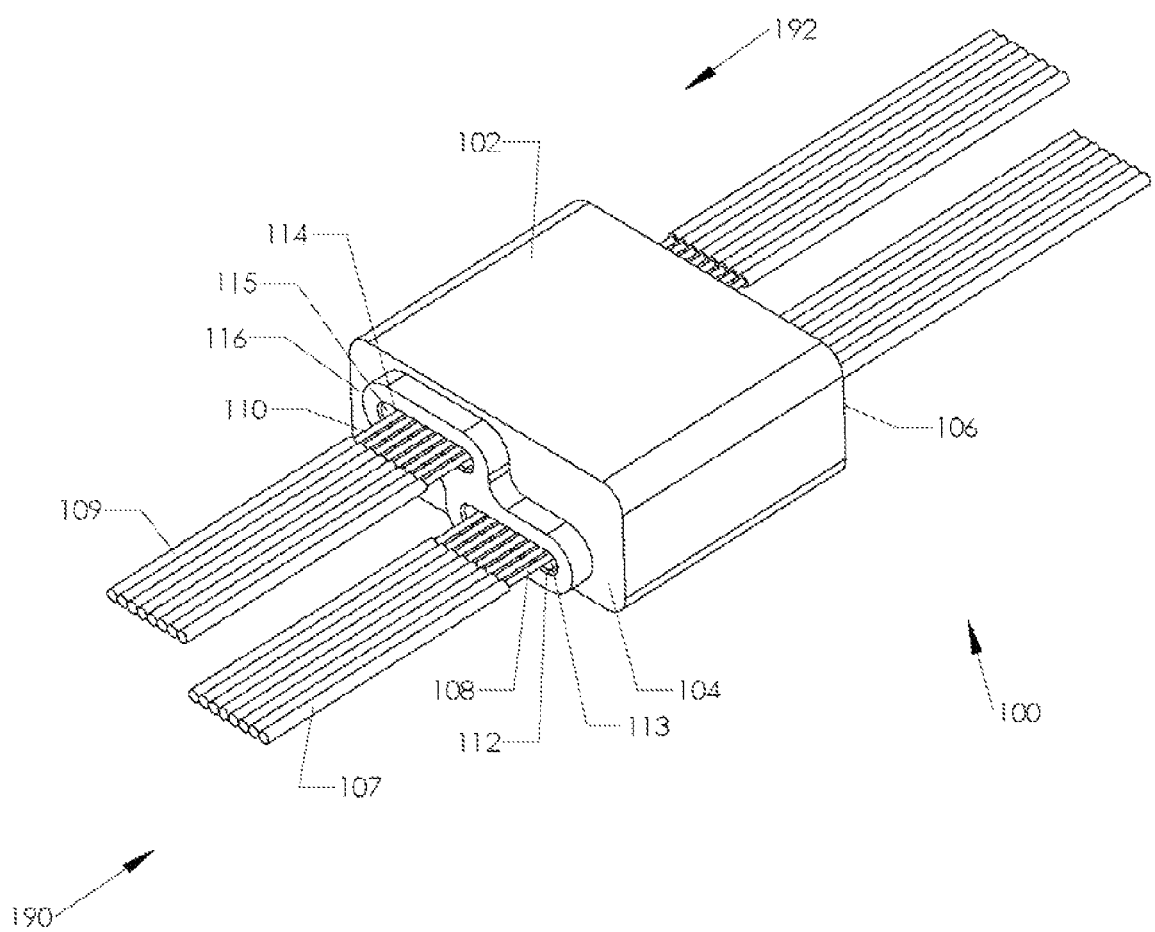
FIG. 1 is a perspective view of a ferrule consistent with the present disclosure.

FIG. 1 illustrates a perspective view of a ferrule 100 consistent with the present disclosure. Ferrule 100 includes body 102, which has a first surface 104 and a second surface 106 opposite first surface 104. Body 102 may include a ceramic or alloy, such as Alloy 52. First fiber portions 108 of first fibers 107 are fed into a first opening 112 defined by a first channel 113. The first fiber portions 108 include parts of fibers 107 which have been stripped of their outer casings.

As further shown in FIG. 1, stripped second fiber portions 110 of fibers 109 are fed into second opening 114 defined by a second channel 115. Preferably a protrusion 116 surrounds the first (112) and second (114) openings. First (113) and second (115) channels extend through body 102 and define third and fourth openings, respectively, in second surface 106. The third and fourth openings are discussed in greater detail below with reference to FIGS. 4 and 5. Fibers 107 and 109 may include either single mode optical fiber (SMF) or multimode optical fiber.

Figure 2:
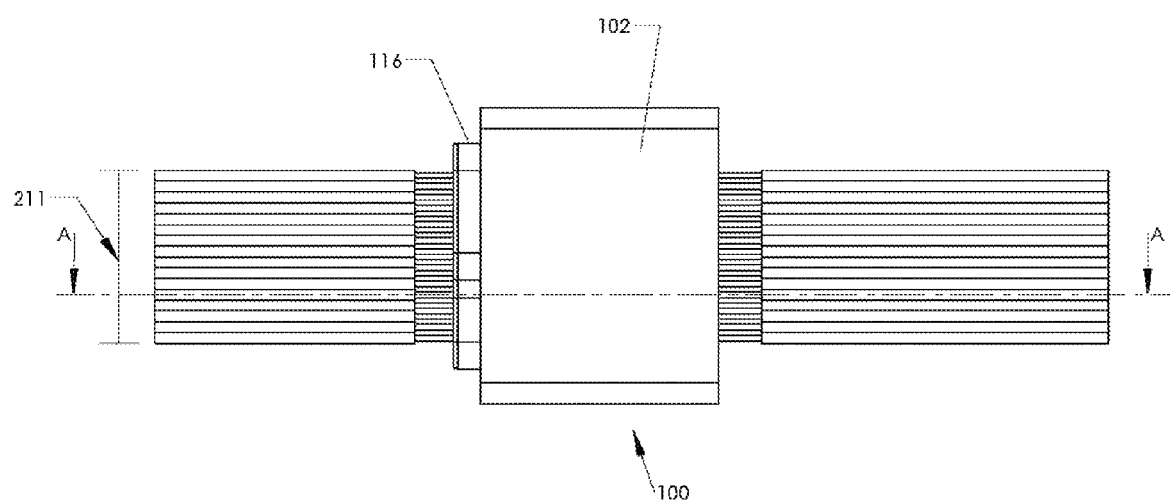
FIG. 2 is a top view of the ferrule shown in FIG. 1.

FIG. 2 is a top view of ferrule 100. As seen in FIG. 2, the lateral spacing between each of fibers 211 (collectively, constituting fibers 107 and fibers 109) is maintained. Lateral spacing of the fibers will be discussed in greater detail with respect to FIG. 6.

Figure 3:
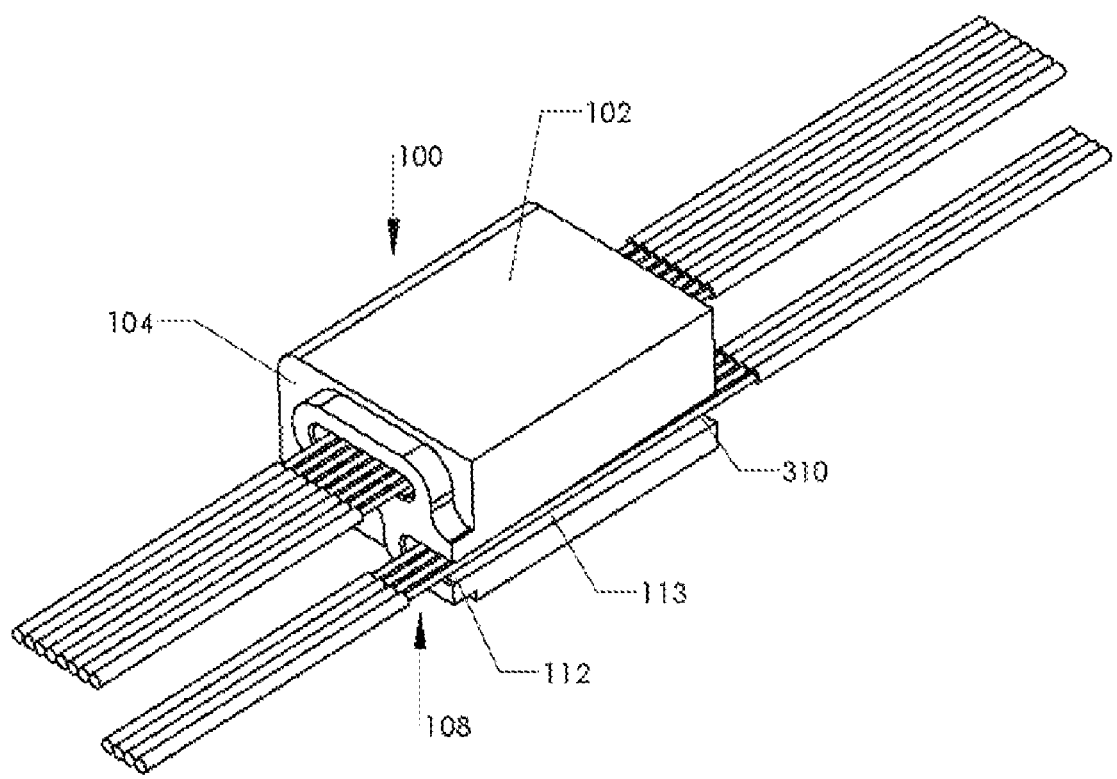
FIG. 3 is a perspective view showing a cross-section of the ferrule shown in FIG. 1.

FIG. 3 is a cross-sectional perspective view of ferrule 100 showing, in greater detail, first channel 113. As noted above, channel 113 extends through body 102 and defines a first opening 112 in first surface 104 and a third opening 310 in second surface 106. Preferably, third opening 310 is larger than first opening 112 to facilitate insertion of fibers 107 and fiber portions 108 through body 102. Accordingly, as shown in FIG. 3 channel 113 tapers in a direction extending from second opening 310 to first opening.

Figure 4:
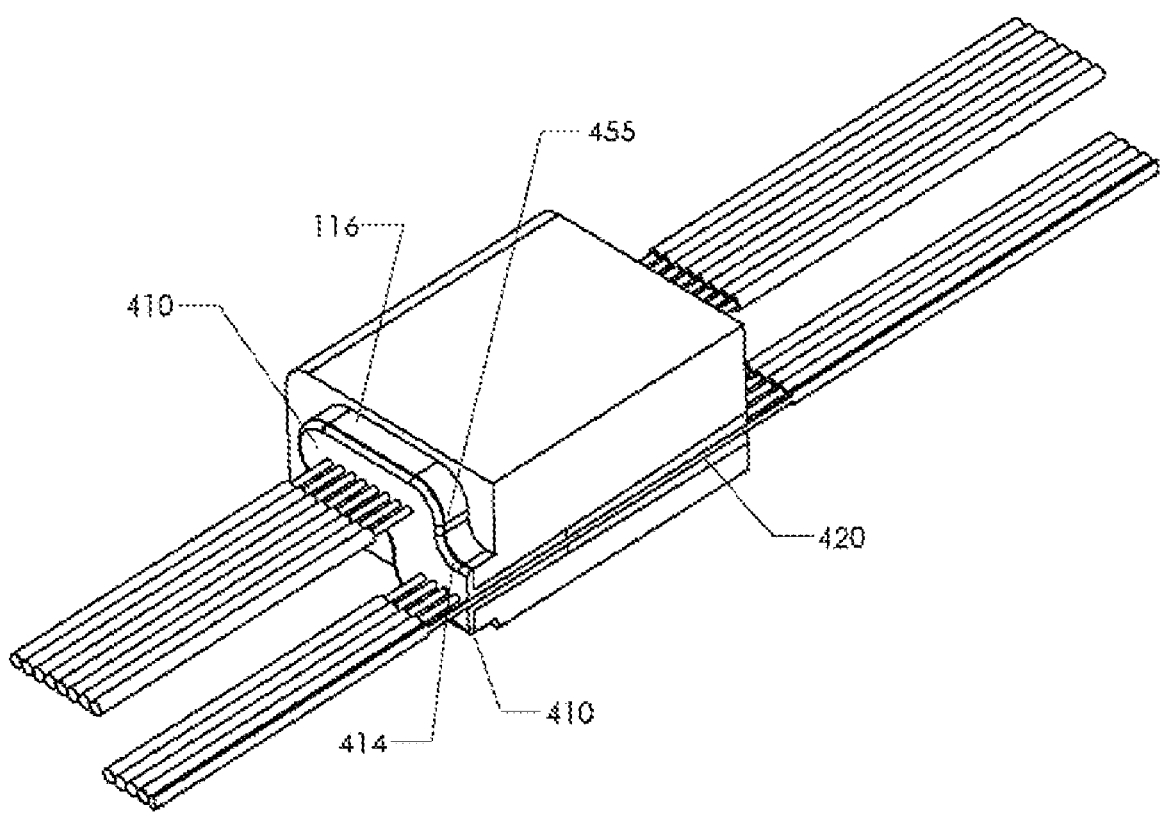
FIG. 4 is a perspective view showing a cross-section of a ferrule consistent with an additional aspect of the present disclosure.

As shown in FIG. 4, first plurality of optical fiber portions 108 are secured with channel 113 by a first resin 420 and an insulative material, such as a glass solder 410. As discussed in greater detail below, glass solder 410 may be provided in channel 113 after fiber portions 108 have been inserted, and then reflowed or melted to hermetically seal and encapsulate fiber portions 108 in channel 113.

Preferably, a protrusion 116 is provided that surrounds openings 112 and 114 and is configured to confine glass solder 410 during reflow such that glass solder 410 forms a meniscus or domed portion 414. Alternatively, portion 455 in FIG. 4 may be removed such that protrusion 116 is divided into first and second protrusions surrounding openings 113 and 115, respectively.

Figure 5:
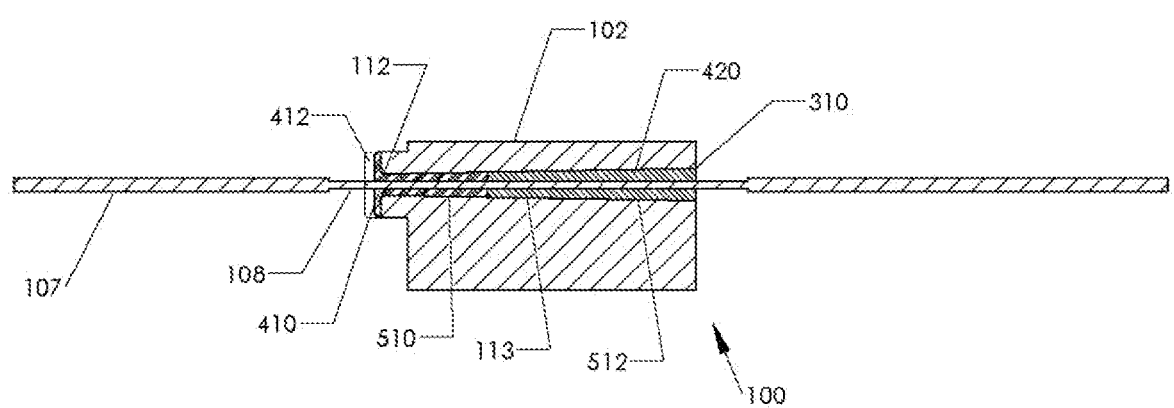
FIG. 5 is a cross-sectional view of a portion of a ferrule consistent with a further aspect of the present disclosure.

FIG. 5 illustrates a cross-sectional view of ferrule 100 taken along line A-A in FIG. 2. As noted above, the width of channel 113 narrows or tapers in a direction toward opening 112. Thus, the width of channel 113 at location 512 in channel 113 is greater than the width of channel 113 at location 510, which is at a distance closer to opening 113 than location 312. As further shown in FIG. 5, an additional layer of UV-curable epoxy 412 may be provided on glass solder 410 to provide further stress relief.

Figure 6:
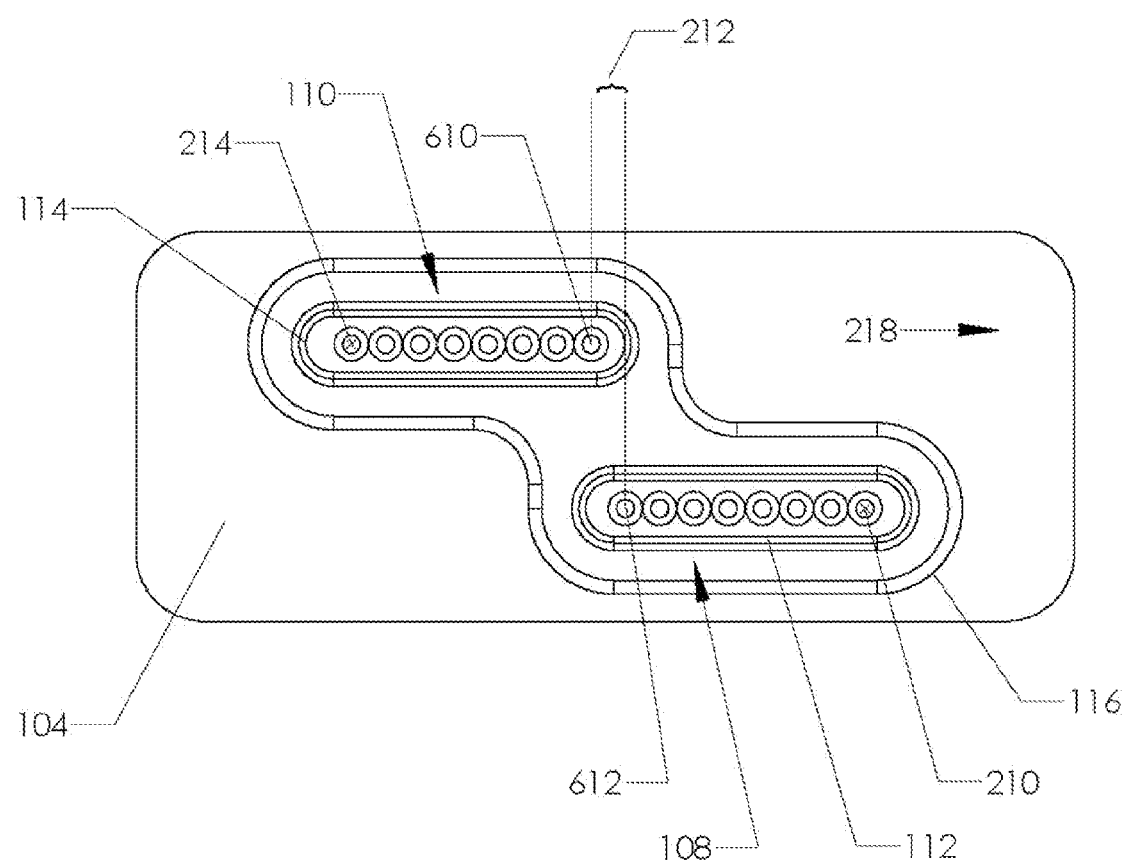
FIG. 6 is a first edge view of the ferrule shown in FIG. 1.

Turning to FIG. 6, which is an edge view of ferrule 100 in the direction indicated by arrow 190 in FIG. 1, each of the first optical fiber portions 108 has a corresponding one of a plurality of first longitudinal axes, one of which is labeled with reference character 210. Each of the plurality of first longitudinal axes is separated from one another by a substantially uniform pitch or spacing 212, which, in this example, may be 0.25 μm. Preferably, this spacing is maintained in the rest of fibers 107, including those portions constituting part of a ribbon cable (not shown). In addition, each of the second optical fiber portions 110 has a corresponding one of a plurality of second longitudinal axes (one of which is labeled by reference character 214). Each of the plurality of second longitudinal axes is separated from one another by the substantially uniform spacing 212.

First (112) and second (114) openings are laterally spaced from one another in a direction (represented by arrow 218) which is perpendicular to the direction in which each of the first longitudinal axes (as well as each of the second longitudinal axes) extends. In addition, the lateral distance between a longitudinal axis of the outermost one 610 of the second plurality of optical fiber portions 110 and a longitudinal axis of the outermost one 612 of the first plurality of optical fiber portions 108 is equal to the lateral spacing between adjacent longitudinal axes of fibers 107, as well as the lateral spacing between adjacent longitudinal axes of fibers 109.

An advantage of ferrule 100 is that first (112) and second (114) openings are narrower than a single opening configured to receive both the first (108) and second (110) optical fiber portions. As a result, the thermal stress associated with the openings, as well as their corresponding channels, is reduced and fiber damage is minimized.

Typically each fiber (e.g., 107) may be bent slightly such that fibers 107 are separated vertically in FIG. 2 by a distance 691 between openings 112 and 114. Since fibers 107 are typically separated from fibers 109 of the ribbon cable a relatively large distance away from ferrule 100, fibers 107 and 109 are gradually bent toward openings 112 and 114, respectively. Accordingly, the bend radii of these fibers is relatively large and may be well above a critical bend radius, beneath which the fibers may break or optical signal quality may be affected. On the other hand, the lateral spacing (212), e.g., in the direction designated by arrow 222, is maintained between the longitudinal axes of adjacent ones of fibers 107 and 109, including portions 108 and 110. Such spacing may be the same as that within the ribbon cable so that fibers 107 and 109 are not bent laterally, thereby minimizing bending stress on these fibers.

Figure 7:
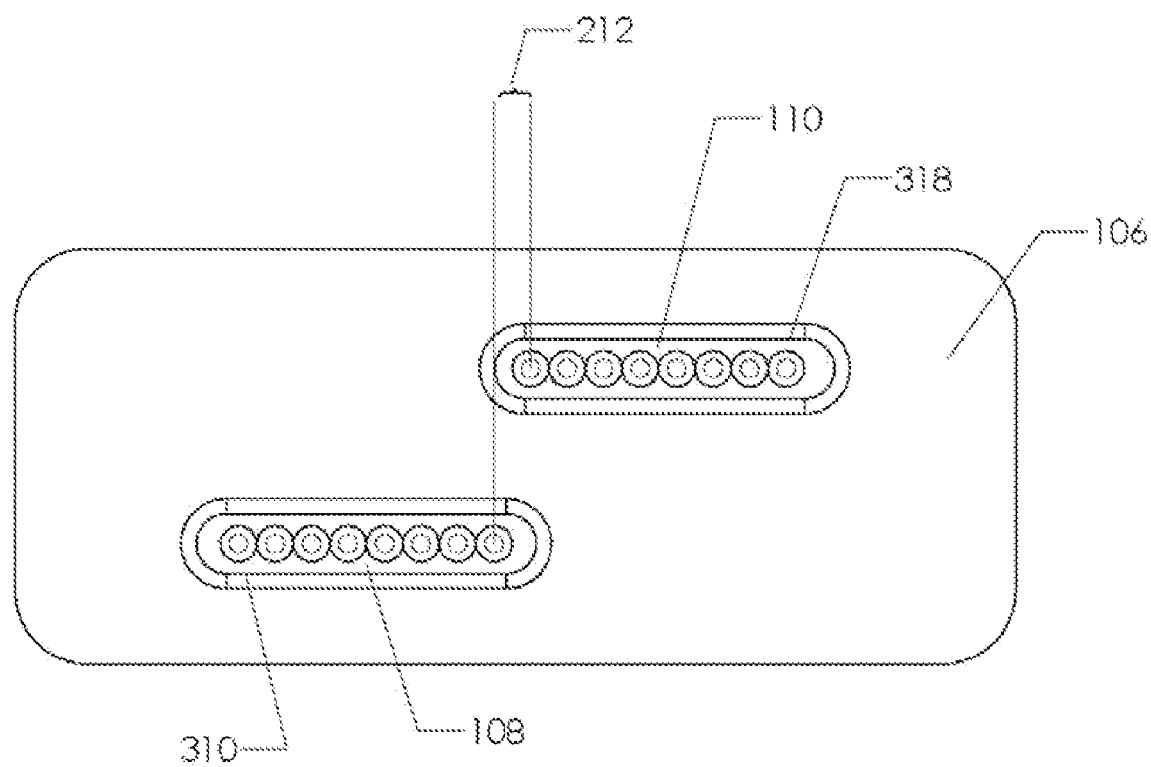
FIG. 7 is a second edge view of the ferrule shown in FIG. 1.

FIG. 7 is an edge view of ferrule 100 in the direction indicated by arrow 192 in FIG. 1. As seen in FIG. 7, the first plurality of optical fiber portions 108 extend out of third opening 310 in second surface 106 and the second plurality of optical fiber portions 110 extend from fourth opening 318 in second surface 106. Fourth opening 318 is defined by second channel 115 while, as noted above, first channel 113 defines third opening 310. Fourth opening 318 is preferably larger than second opening 114, and, as further noted above, third opening 310 is larger than first opening 112.

Figure 8:
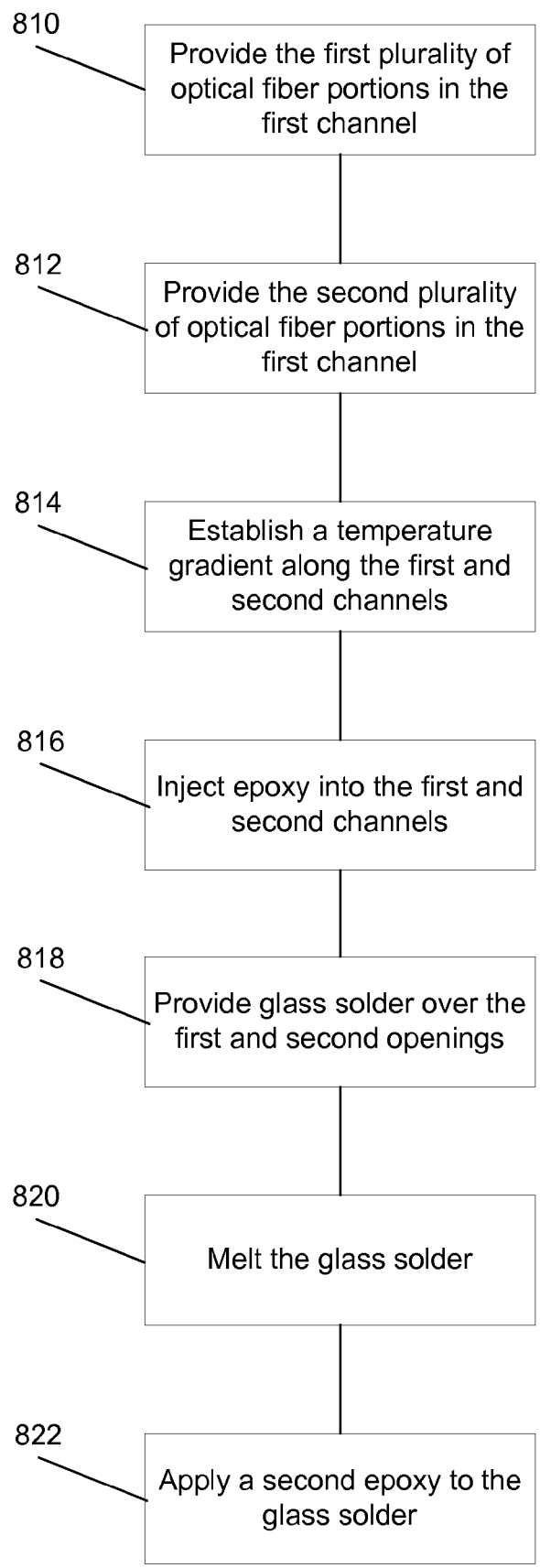
FIG. 8 is a flow chart illustrating steps of a manufacturing method consistent with an additional aspect of the present disclosure.

A method of mounting the fibers 107 and 109 within ferrule 100 will next be described with reference to FIG. 8. In step 810, the first plurality of optical fiber portions 108 are provided in first channel 113, and, in a second step 812 which may occur simultaneously with step 810, the second plurality of optical fiber portions 110 are provided in second opening 114. A temperature gradient is established between the first (112) and third (310) openings such that the temperature decreases from the third opening 310 to the first opening 112 (step 814). A similar temperature gradient is also created between the second (114) and fourth (318) openings. Epoxy 420 is then injected into first channel 113 through one of the first (112) and third (310) openings (816). Simultaneously, or in a separate step, epoxy is also injected into second channel 115 through one of the second (114) and fourth (318) openings. Next, in step 818, glass solder 410 may be provided over the first (112) and second (114) openings, and, in step 820, melted to form the structure shown in FIG. 4. Optionally, another or second epoxy 412 may be provided on glass solder 410 (step 822) for further stress relief, as discussed above. Epoxy 412 typically includes an ultraviolet curable resin. In that case, the above described method may further include a step of exposing epoxy 412 to ultraviolet light in order to cure the resin.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A ferrule, comprising:
a body having a first surface and a second surface opposite the first surface
a first channel provided in the body and extending from the first surface to the second surface, the first channel being configured to accommodate a first plurality of optical fibers, the first plurality of optical fibers being arranged in a first linear array, first and second outermost ones of the first plurality of optical fibers are arranged such that remaining ones of the first plurality of optical fibers are provided between the first and second outermost ones of the first plurality of optical fibers, each of the first plurality of optical fibers having a corresponding one of a first plurality of longitudinal axes, each of the first plurality of longitudinal axes being separated from one another by a substantially uniform spacing and extending in a first direction, each of the first plurality of longitudinal axes being laterally spaced from one another in a second direction;
a second channel provided in the body and extending from the first surface to the second surface, the second channel being configured to accommodate a second plurality of optical fibers, the second plurality of optical fibers being arranged in a second linear array, first and second outermost ones of the plurality of optical fibers are arranged such that remaining ones of the first plurality of optical fibers are provided between the first and second outermost ones of the second plurality of optical fibers, each of the second plurality of optical fibers having a corresponding one of a second plurality of longitudinal axes, each of the second plurality of longitudinal axes being separated from one another by the spacing and extending in the first direction, each of the second plurality of longitudinal axes being laterally spaced from one another in the second direction,
wherein the first channel defines a first opening in the first surface and the second channel defines a second opening in the first surface, the first opening being separated from the second opening such that an outermost one of the first plurality of longitudinal axes associated with the first outermost one of the first plurality of optical fibers is laterally spaced in the second direction from an outermost one of the second plurality of longitudinal axes associated with the first outermost one of the second plurality of optical fibers by the spacing.

2. A ferrule in accordance with claim 1, wherein each of the first plurality of optical fibers and each of the second plurality of optical fibers includes a single mode optical fiber.

3. A ferrule in accordance with claim 1, wherein each of the first plurality of optical fibers and each of the second plurality of optical fibers includes a multimode optical fiber.

4. A ferrule in accordance with claim 1, wherein the first channel further defines a third opening in the second surface of the body and the second channel further defines a fourth opening in the second surface of the body.

5. A ferrule in accordance with claim 4, wherein the third opening is larger than the first opening and the fourth opening in larger than the second opening.

6. A ferrule in accordance with claim 1, wherein the body includes a protrusion extending from the first surface, the protrusion surrounding the first and second openings.

7. A ferrule in accordance with claim 1, wherein the body includes first and second protrusions extending from the first surface, the first protrusion surrounding the first opening and the second protrusion surrounding the second opening.

8. A ferrule in accordance with claim 1, wherein the body includes Alloy 52.

9. A ferrule in accordance with claim 1, wherein the first and second openings are offset relative to one another in the first surface.

* * * * *